US012059585B2

(12) United States Patent
Minnick et al.

(10) Patent No.: US 12,059,585 B2
(45) Date of Patent: Aug. 13, 2024

(54) FALL ARREST SYSTEM

(71) Applicant: Oshkosh Corporation, Oshkosh, WI (US)

(72) Inventors: Nicholas Minnick, Oshkosh, WI (US); Fredric Yutzy, Oshkosh, WI (US); Korry Kobel, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 955 days.

(21) Appl. No.: 17/004,978

(22) Filed: Aug. 27, 2020

(65) Prior Publication Data

US 2021/0060366 A1 Mar. 4, 2021

Related U.S. Application Data

(60) Provisional application No. 62/892,972, filed on Aug. 28, 2019.

(51) Int. Cl.

*A62B 35/00* (2006.01)
*B66F 11/04* (2006.01)
*B66F 17/00* (2006.01)

(52) U.S. Cl.

CPC ...... *A62B 35/0056* (2013.01); *A62B 35/0018* (2013.01); *A62B 35/0068* (2013.01); *A62B 35/0081* (2013.01); *B66F 11/044* (2013.01); *B66F 17/006* (2013.01)

(58) Field of Classification Search

CPC .......................... A62B 35/0056; B66F 11/006
See application file for complete search history.

(56) References Cited

U.S. PATENT DOCUMENTS 6,330,931 B1 * 12/2001 Baillargeon ....... A62B 35/0068 182/2.1
6,604,605 B2 * 8/2003 Peterson ............ A62B 35/0087 182/36
6,823,964 B2 * 11/2004 Goode ..................... A62B 1/22 182/2.1
7,946,539 B2 * 5/2011 Lara .................. A62B 35/0056 248/65

(Continued)

FOREIGN PATENT DOCUMENTS

WO WO-2019/126135 6/2019

OTHER PUBLICATIONS

Genie Fall Arrest Bar, https://www.youtube.com/watch?v=-k_W4qDSAhU&list=PLW5WTShxMaiXJOTzo3ZSSINWhMj2TDsi7&index=15 uploaded on Aug. 4, 2016, 14 pages.

(Continued)

*Primary Examiner* — Ryan D Kwiecinski
*Assistant Examiner* — Kathleen M. McFarland
(74) *Attorney, Agent, or Firm* — Foley & Lardner LLP

(57) ABSTRACT

A fall arrest system for use with a platform includes a harness configured to be worn by an operator, a first bracket and a second bracket configured to be coupled to the platform, a horizontal support including a first end portion coupled to the first bracket and a second end portion coupled to the second bracket, and a harness adapter coupled to the harness, the harness adapter defining an aperture that receives the horizontal support. The harness adapter is repositionable along a length of the horizontal support.

18 Claims, 12 Drawing Sheets

(56) References Cited

U.S. PATENT DOCUMENTS 8,899,380 B2 * 12/2014 Chard ................... B66F 17/006 182/2.1
9,238,573 B2 * 1/2016 Luminet ................. B66F 11/04
9,480,865 B2 * 11/2016 Naylor ................ E04G 21/3295
9,586,799 B2 * 3/2017 Hao ...................... B66F 17/006
9,611,664 B2 * 4/2017 Tsaousis ................. E04G 5/045
9,656,845 B2 * 5/2017 Dittus ................... B66F 11/044
9,676,602 B2 * 6/2017 Cummings ........... B66F 11/046
9,679,461 B2 * 6/2017 Cummings ........... B66F 17/006
9,844,689 B2 * 12/2017 LaRue .................. B66F 17/006
9,862,582 B2 * 1/2018 Cummings ............. B66F 11/04
10,029,899 B2 * 7/2018 Hao ........................ B66F 11/04
10,099,909 B2 * 10/2018 Steedley ............... B66F 17/006
10,358,331 B2 * 7/2019 Lombardo ............ B66F 11/044
10,618,786 B2 * 4/2020 Parot ..................... B66F 17/006
10,738,491 B2 * 8/2020 Donaldson ............ F16D 63/008
10,814,149 B2 * 10/2020 Liggett .............. A62B 35/0075
10,898,740 B2 * 1/2021 McKay .............. A62B 35/0018
10,988,361 B2 * 4/2021 Luminet ............... B66F 11/046
11,173,825 B2 * 11/2021 Nelson ...................... B60P 1/48
11,180,354 B2 * 11/2021 Hubert ................ F02N 11/0825
11,247,886 B2 * 2/2022 Fritel .................... B66F 11/046
11,254,499 B2 * 2/2022 Rocholl .................... B65F 3/06
11,273,978 B2 * 3/2022 Buege ....................... B65F 3/08
11,359,393 B2 * 6/2022 Schubart ................. E04G 21/16
11,380,145 B2 * 7/2022 Koga ..................... G07C 5/008
11,401,148 B2 * 8/2022 Maisonnette ......... B66F 17/006
11,414,267 B2 * 8/2022 Rocholl .................. B65F 3/041
11,447,020 B2 * 9/2022 Lombardo ................ B60L 1/02
11,447,334 B2 * 9/2022 Buege ....................... B65F 3/08
11,505,403 B2 * 11/2022 Rocholl .................. B65F 3/041
11,511,642 B2 * 11/2022 Messina ................. B60K 17/28
11,537,136 B2 * 12/2022 Clifton ................. G05D 1/0094
11,597,439 B2 * 3/2023 Calliari .................. B60D 1/488
11,597,638 B2 * 3/2023 Puszkiewicz ......... B66F 11/044
11,649,111 B2 * 5/2023 Rocholl .................. B65F 3/041 414/217
2002/0125069 A1 * 9/2002 Peterson ................ A62B 35/04 182/36
2002/0170783 A1 * 11/2002 Goode ..................... A62B 1/22 187/240
2006/0016636 A1 * 1/2006 Durbic ................... A62B 35/04 182/3
2006/0272891 A1 * 12/2006 Casebolt ............ A62B 35/0056 182/36
2010/0133389 A1 * 6/2010 Lara ................... A62B 35/0056 248/65
2011/0073408 A1 * 3/2011 Vetesnik ............. E04G 21/3276 182/36
2011/0168486 A1 * 7/2011 Dobrovolsky ........ B66F 17/006 187/269
2012/0193168 A1 * 8/2012 Taylor ................ A62B 35/0056 182/112
2013/0069026 A1 * 3/2013 Bergendahl ............. E01F 15/06 29/428
2013/0153333 A1 * 6/2013 Richards ............... B66F 17/006 182/113
2013/0153335 A1 * 6/2013 Luminet ................ A42B 3/046 182/112
2013/0228394 A1 * 9/2013 Sousa ................. E04G 21/3295 248/231.41
2013/0233645 A1 * 9/2013 Hao ...................... B66F 17/006 182/19
2013/0240298 A1 * 9/2013 Naylor ................ E04G 21/3295 182/231
2013/0313040 A1 * 11/2013 Cummings ........... B66F 11/046 182/19
2015/0008073 A1 * 1/2015 Cummings ........... B66F 17/006 182/148
2015/0027808 A1 * 1/2015 Baillargeon ....... A62B 35/0025 182/19
2015/0144426 A1 * 5/2015 Hao ...................... B66F 17/006 182/113
2015/0314150 A1 * 11/2015 LaRue ............... A62B 35/0075 182/3
2016/0075543 A1 * 3/2016 Lombardo ............ B66F 11/044 187/247
2016/0098910 A1 * 4/2016 Cummings ............ G08B 21/02 340/540
2016/0137471 A1 * 5/2016 Dittus ................... B66F 17/006 182/18
2016/0214843 A1 * 7/2016 Parot ..................... B66F 11/044
2016/0346570 A1 * 12/2016 Anson ........................ E04G 1/28
2016/0356050 A1 * 12/2016 Tsaousis ................. E04G 5/045
2017/0072233 A1 * 3/2017 Keiser ................... B66F 17/006
2018/0362313 A1 * 12/2018 Bonnefoy ............. B66F 17/006
2019/0070444 A1 * 3/2019 Seman ............... A62B 35/0037
2019/0106309 A1 * 4/2019 Mueller .................. B66F 11/04
2019/0118010 A1 * 4/2019 Patton .................... A62B 35/04
2019/0119090 A1 * 4/2019 Maisonnette ......... B66F 11/046
2019/0134438 A1 * 5/2019 Liggett .................. A62B 35/04
2019/0143155 A1 * 5/2019 McKay .............. A62B 35/0075 182/6
2019/0152753 A1 * 5/2019 Vial ...................... B66F 17/006
2019/0210852 A1 * 7/2019 Fritel .................... B66F 11/044
2019/0225471 A1 * 7/2019 Luminet ............... B66F 11/042
2019/0269949 A1 * 9/2019 Kennedy ............ A62B 35/0081
2020/0095105 A1 * 3/2020 Yutzy .................... B66F 11/042
2020/0102762 A1 * 4/2020 Donaldson ............ E04G 21/167
2020/0130746 A1 * 4/2020 Calliari ................ B60K 17/344
2020/0262328 A1 * 8/2020 Nelson ...................... B60P 1/48
2020/0265656 A1 * 8/2020 Koga ........................ G07C 5/08
2020/0282244 A1 * 9/2020 Florence ................. G01L 5/047
2020/0290852 A1 * 9/2020 Rosencrance ............. B66F 7/28
2020/0307017 A1 * 10/2020 Schubart ................. B28B 17/02
2020/0308854 A1 * 10/2020 Schubart ................. E04G 21/16
2020/0316816 A1 * 10/2020 Messina .................... B60K 1/02
2020/0317065 A1 * 10/2020 Lombardo .............. B60L 50/66
2020/0317486 A1 * 10/2020 Puszkiewicz ............ B60G 9/02
2020/0346657 A1 * 11/2020 Clifton ................... B62D 33/04
2020/0346854 A1 * 11/2020 Rocholl .................. B65F 3/041
2020/0346855 A1 * 11/2020 Rocholl .................. B65F 3/041
2020/0346857 A1 * 11/2020 Rocholl .................... B65F 3/08
2020/0346858 A1 * 11/2020 Buege ....................... B65F 3/08
2020/0346859 A1 * 11/2020 Buege ..................... B65F 3/048
2020/0348681 A1 * 11/2020 Clifton ................. G05D 1/0231
2021/0078844 A1 * 3/2021 Hubert .................. B66F 11/044

OTHER PUBLICATIONS

International Search Report and Written Opinion on PCT/US2020/048240, dated Nov. 20, 2020, 16 pages.
Save Time and Money with the JLG® Bolt-On Fall Arrest System, https://www.youtube.com/watch?v=Lavw7e_yHDo uploaded on Feb. 12, 2019, 18 pages.

* cited by examiner

FALL ARREST SYSTEM

CROSS-REFERENCE TO RELATED PATENT APPLICATION

This application claims the benefit of U.S. Provisional Patent Application No. 62/892,972, filed Aug. 28, 2019, which is incorporated herein by reference in its entirety.

BACKGROUND

The present disclosure relates generally to safety equipment. More specifically, the present disclosure relates to fall arrest systems.

Fall arrest systems are used when operators (e.g., construction workers, inspectors, etc.) are performing tasks that require the operator to be elevated above the ground or another support surface (e.g., aircraft inspection, roof installation, chimney repair, bridge construction, painting, etc.). A fall arrest system typically includes a harness that is fitted onto the operator. The harness is attached to a fall limiter (e.g., a lifeline, a lanyard, etc.), which is in turn attached to an anchor point. If the operator begins falling, the fall limiter applies a force on the harness to gradually reduce the falling speed of the operator.

SUMMARY

At least one embodiment relates to a fall arrest system for use with a platform. The fall arrest system includes a harness configured to be worn by an operator, a first bracket configured to be coupled to the platform, a second bracket configured to be coupled to the platform, a horizontal support including a first end portion coupled to the first bracket and a second end portion coupled to the second bracket, and a harness adapter coupled to the harness, the harness adapter defining an aperture that receives the horizontal support. The harness adapter is repositionable along a length of the horizontal support.

Another embodiment relates to a platform assembly including a platform defining a support surface for an operator, the platform including a guardrail extending above the support surface, a first bracket removably coupled to the guardrail, a second bracket removably coupled to the guardrail and laterally offset from the first bracket, a support member coupled to the first bracket and the second bracket and extending laterally between the first bracket and the second bracket, an anchor slidably coupled to the support member such that the anchor is repositionable laterally along the support member, and a fall limiter coupling the anchor to a harness. The support member is positioned above the guardrail.

Another embodiment relates to a method of providing a fall arrest system. The method includes providing a harness adapter configured to be coupled to a harness worn by an operator, coupling a first bracket and a second bracket to a guardrail of a platform, coupling a first end portion of a tensile member to the first bracket, inserting the tensile member through an aperture defined by the harness adapter such that the harness adapter is repositionable along a length of the tensile member, and coupling a second end portion of the tensile member to the second bracket.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
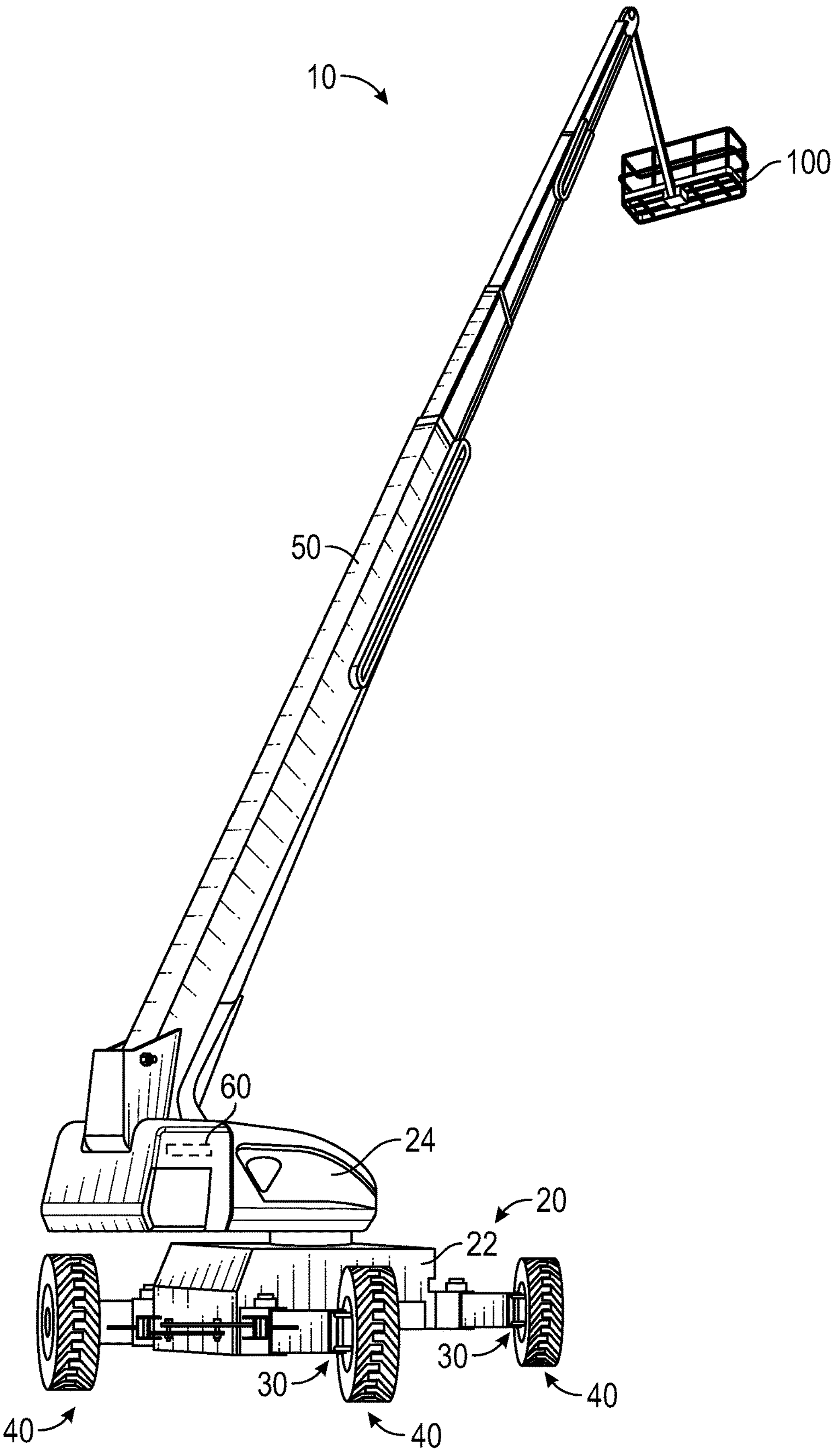
FIG. 1 is a perspective view of a lift assembly, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, a fall arrest system is selectively coupled to (e.g., bolted onto, etc.) a platform of a lift device. The platform includes a base that is configured to support an operator and a guardrail that is fixedly coupled to the base. A working area is defined between the guardrail and the base. A top portion of the guardrail (e.g., a tubular member) surrounds or partially surrounds the working area, providing a boundary that prevents an operator from falling off of the platform.

If the operator falls from the platform, the fall arrest system is configured to gradually reduce the falling speed of the operator and prevent injury. The fall arrest system includes a harness that is installed on (e.g., worn by) an operator and a fall limiter that extends between and couples the harness and an anchor point on the platform. The platform (e.g., the guardrail) may define one or more fixed anchor points to which the fall limiter can be coupled. The fall arrest system further includes an anchor assembly that defines another anchor point to which the fall limiter may be coupled.

The anchor assembly is selectively coupled (e.g., fastened) to the top portion of the guardrail. The anchor assembly includes a pair of brackets, each of which are selectively coupled to opposite ends of a front portion of the guardrail. The first bracket includes a boss defining a first aperture extending in a first direction, and the second bracket includes a boss defining a second aperture extending perpendicular to the first aperture. A clevis is coupled to the second boss (e.g., by inserting a bolt or pin through the first aperture). A cable coupled to the clevis extends along and above the front portion of the guardrail toward the first bracket. A threaded stud is coupled to the cable and extends through the first aperture of the first bracket. A nut is threaded onto the threaded stud and tightened to tension the cable. A movable attachment point (e.g., a ring, an anchor) receives the cable therethrough such that the movable attachment point can translate along the length of the cable. The fall limiter may then be coupled to the movable attachment point.

Because the ring is able to translate freely along the length of the cable, the operator can freely move about the working area without having to disconnect and reconnect the fall limiter to different anchor points. Additionally, because the anchor assembly is positioned at the front of the guardrail, the operator is free to exit the working area and stand on an external surface near the front of the platform without having to disconnect the fall limiter. Instead, the fall limiter simply moves over the front of the guardrail to permit the movement of the operator.

In some embodiments, the anchor assembly is a bolt-on assembly that can be attached to any platform having a certain guardrail configuration. The anchor assembly may accordingly be sold separately from the lift device and used to upgrade the lift device (e.g., may act as a retrofit kit). Additionally, one anchor assembly may be purchased for use with multiple lift devices and moved between the lift devices as necessary.

According to the exemplary embodiment shown in FIG. 1, a lift device, shown as lift device 10, includes a chassis, shown as chassis 20. According to an exemplary embodiment, the chassis 20 includes a frame, shown as frame 22. As shown in FIG. 1, the lift device includes a series of axles, shown as axles 30, coupled to the frame 22. In one embodiment, the lift device 10 includes a plurality of independent axles 30 (e.g., four, etc.) coupled to the frame 22. In another embodiment, the lift device 10 includes a first solid axle 30 coupled to a front end of the frame 22 and a second solid axle 30 coupled to a rear end of the frame 22. A wheel assembly (e.g., a wheel and tire assembly), shown as wheel assembly 40, is coupled to an end of each axle 30. The lift device 10 may include one or more actuators (e.g., hydraulic cylinders) to rotate the axles 30 relative to the frame 22 and/or to rotate the wheel assemblies 40 relative to the axles 30 (e.g., about respective vertical axes). This may facilitate varying the wheelbase of the lift device. The wheel assemblies 40 may include one or more actuators to drive the wheels and propel the lift device 10.

As shown in FIG. 1, the lift device 10 includes a lift assembly, shown as lift boom 50. In some embodiments, the lift boom 50 is rotatably coupled to the chassis 20. As shown in FIG. 1, the lift boom 50 is directly, pivotally coupled to a turntable 24 (e.g., such that the lift boom 50 rotates relative to the turntable 24 about a horizontal axis). The turntable 24 is rotatably coupled to the frame 22 (e.g., such that the lift boom 50 and the turntable 24 rotate relative to the frame 22 about a vertical axis). Rotation of the turntable 24 may be facilitated by a bearing disposed between the turntable 24 and the frame 22. As shown in FIG. 1, an operational device (e.g., an aerial work platform), shown as platform 100, is coupled to an end of the lift boom 50 opposite the frame 22.

Referring still to FIG. 1, the lift boom 50 includes a plurality of telescoping boom sections. An actuator may extend the plurality of telescoping boom sections to increase the extension length of the lift boom 50 (e.g., during operation of the lift device 10 by an operator aboard the platform 100, etc.). According to the exemplary embodiment shown in FIG. 1, the lift boom 50 is pivotally coupled to the turntable 24 such that the platform 100 may be elevated relative to a ground surface. In one embodiment, an actuator pivots the lift boom 50 upward, thereby increasing a working height of the platform 100.

As shown in FIG. 1, the lift device 10 includes a controller 60. The controller 60 is configured to facilitate various operations of the lift device 10. By way of example, the controller 60 may be configured to provide command signals relating to the rotation of the turntable 24 and the lift boom 50 relative to the frame 22, the extension of the lift boom 50, and the rotation of at least one of the wheel assemblies 40 (e.g., to drive the lift device 10, etc.). The controller 60 may also be configured to engage at least one actuator to facilitate movement of at least one of the wheel assemblies 40, the turntable 24, the lift boom 50, and the platform 100. By way of another example, the controller 60 may be communicably coupled with an operator input/output (I/O) device (e.g., a user interface) such that an operator of the lift device 10 may provide a variety of commands to the controller 60.

In other embodiments, the platform 100 is used with a different lift device or vehicle. By way of example, the platform 100 may be used with a boom lift, a scissor lift, a vertical lift, a telehandler outfitted with an operator platform, a crane, or another lift device. In yet other embodiments, the platform 100 is a fixed, stationary, or immobile platform, such as a catwalk, a scaffold, or a floor of a building.

Figure 2:
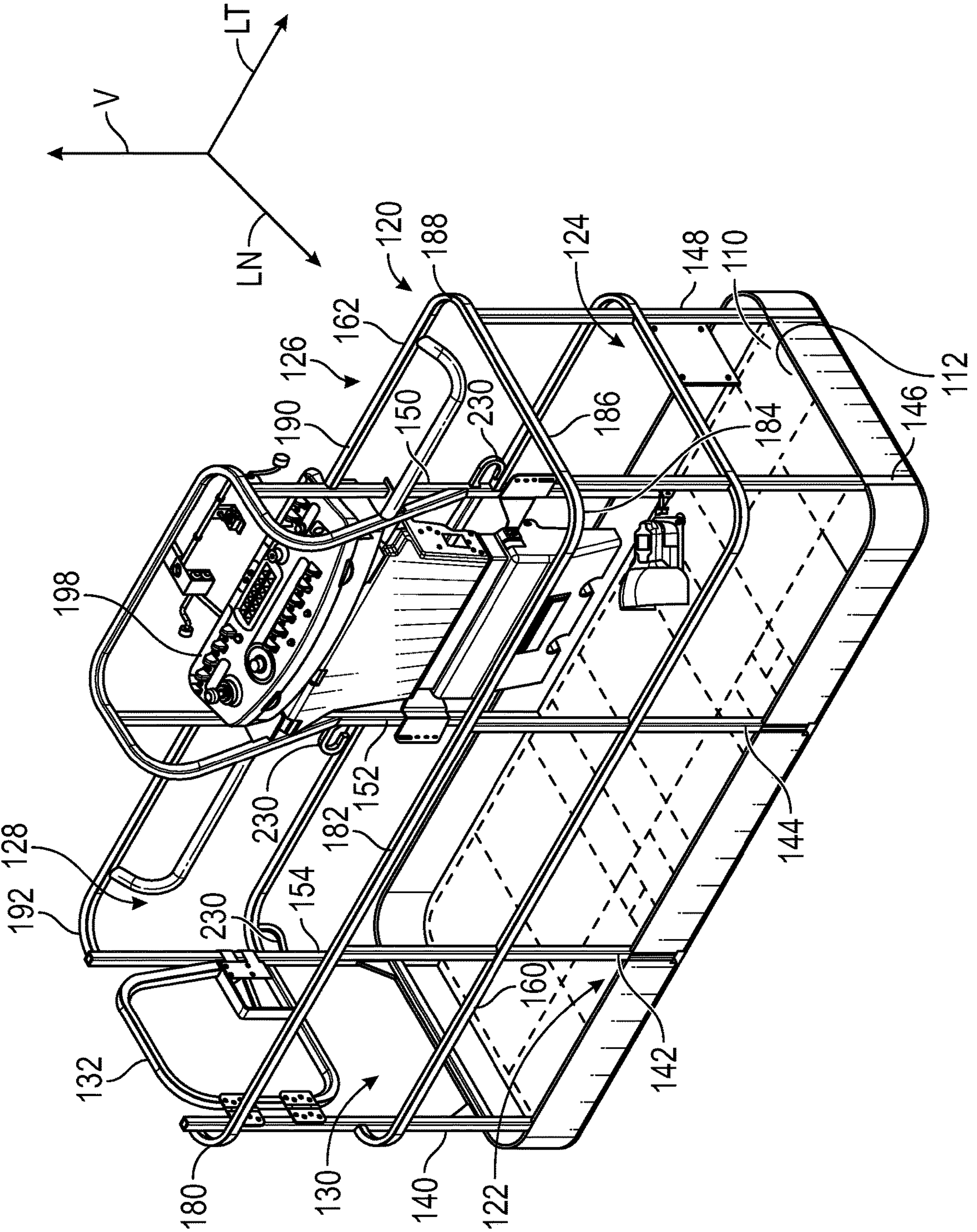
FIG. 2 is a perspective view of a platform of the lift assembly.

Referring to FIG. 2, the platform 100 is shown according to an exemplary embodiment. The platform 100 is configured to support an operator while elevated above the ground. The operator may perform one or more tasks while supported by the platform 100, or the operator may use the platform 100 to reach an elevated surface and subsequently exit the platform 100. A vertical axis V, a lateral axis LT, and a longitudinal axis LN are defined with respect to the platform.

The platform 100 includes a flat support surface, base, or platform, shown as base 110. A top surface of the base 110 (i.e., a support surface 112) is configured to support one or more operators. The support surface 112 may be a continuous, substantially flat surface, or the support surface 112 may include multiple sections that are separated from one another by one or more obstructions (e.g., a gap, a protrusion, etc.). By way of example, the base 110 may include one or more sheets of expanded metal.

The platform 100 further includes a guard, railing, rail, handrail, guardrail, guiderail, or boundary assembly, shown as guardrail 120. The guardrail 120 is configured to provide support for an operator and to prevent the operator from falling off of the platform 100. The guardrail 120 is fixedly coupled to the base 110 and extends upward, above the support surface 112. The guardrail 120 extends along a perimeter of the base 110. Specifically, as shown in FIG. 2, the guardrail 120 includes a front portion 122 extending along a front side of the base 110, a right portion 124 extending along a right side of the base 110, and a rear portion 126 extending along the rear side of the base 110. As shown, the front portion 122, the right portion 124, and the rear portion 126 are continuous with one another. In other embodiments, the front portion 122, the right portion 124, and/or the rear portion 126 are (a) separated by one or more gaps, (b) made up of multiple sections, and/or (c) omitted. A volume, shown as working area 128, is defined between the base 110, the front portion 122, the right portion 124, and the rear portion 126. The working area 128 defines an area in which an operator can stand upon the base 110 while being contained within the guardrail 120.

An aperture, gap, or opening, shown as doorway 130, is defined at the left side of the base 110 between the front portion 122 and the rear portion 126. A door or gate, shown as gate 132, selectively extends across the doorway 130 to prevent passage of the operator through the doorway 130. Specifically, the gate 132 is pivotally coupled to the front portion 122 (e.g., by a hinge) and selectively coupled to the rear portion 126 (e.g., by a latch).

The guardrail 120 includes a series of upright members (e.g., members that are substantially vertical when the base 110 is level) and a series of horizontal members (e.g., members that are substantially horizontal when the base 110 is level). The upright members are approximately evenly spaced along the perimeter of the base 110 and fixedly coupled to the base 110. Specifically, proceeding counter-clockwise as viewed from above, the guardrail 120 includes the following upright members: upright member 140, upright member 142, upright member 144, upright member 146, upright member 148, upright member 150, upright member 152, and upright member 154. The guardrail 120 includes a first horizontal member, shown as middle rail 160, and a second horizontal member or handrail, shown as top rail 162. The middle rail 160 is positioned between the top rail 162 and the base 110. The top rail 162 defines a top surface of the guardrail 120. Each horizontal member or vertical member may include a single member or multiple members that are substantially aligned with one another. By way of example, the upright member 154 includes a single, continuous member, whereas the upright member 144 is bisected by the middle rail 160.

As shown, the top rail 162 includes a series of curved and straight sections that are arranged in a generally C-shape extending from the upright member 140 to the upright member 154. A first curved section 180 is coupled to a top end portion of the first upright member 140. A first straight section 182 extends in a lateral direction from the first curved section 180 to a second curved section 184. The first straight section 182 is coupled to top end portions of the upright member 142 and the upright member 144. A second straight section 186 extends between the second curved section 184 and a third curved section 188. The second straight section 186 is coupled to top end portions of the upright member 146 and the upright member 148. A third straight section 190 extends between the third curved section 188 and a fourth curved section 192. The third straight section 190 is formed in two parts, each part being coupled to a middle section of the upright member 150 or the upright member 152. The fourth curved section 192 is coupled to the upright member 154. As shown, each curved section is curved approximately 90 degrees.

The platform 100 provides a surface upon which operators stand while operating the lift device 10 with an I/O device 198. Specifically, the I/O device 198 is coupled to the guardrail 120 between the upright member 150 and the upright member 152. The I/O device 198 faces inward such that it can be used by an operator standing within the working area 128. In one embodiment, the I/O device 198 is communicably coupled to various components of the lift device 10 (e.g., the wheel assemblies 40, the turntable 24, the lift boom 50, the platform 100, the controller 60, etc.) such that information or signals (e.g., command signals, etc.) may be exchanged to and from the I/O device 198. By way of example, the I/O device 198 may include at least one of an interactive display, a touchscreen device, one or more buttons, joysticks, switches, and/or voice command receivers. An operator may use a joystick associated with the I/O device 198 to trigger the engagement of an actuator positioned to turn one of the wheel assemblies 40, thereby turning the lift device 10 towards a desired location. By way of another example, an operator may engage a lever associated with the I/O device 198 to trigger the extension or retraction of the plurality of sections of the lift boom 50.

Figure 4:
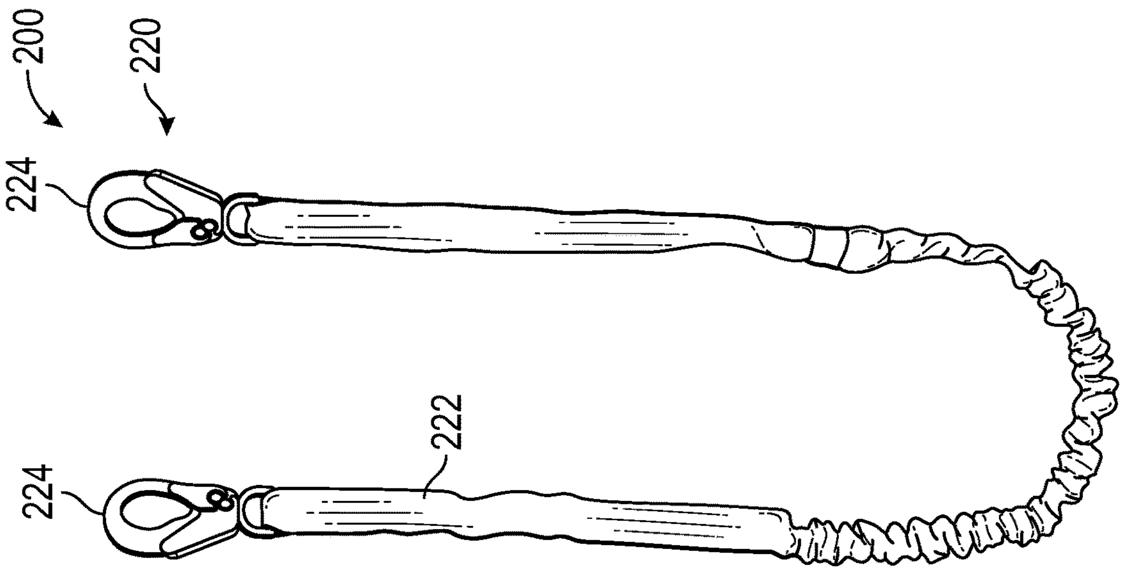
FIG. 4 is a front view of a fall limiter of a fall arrest system, according to an exemplary embodiment.
Figure 3:
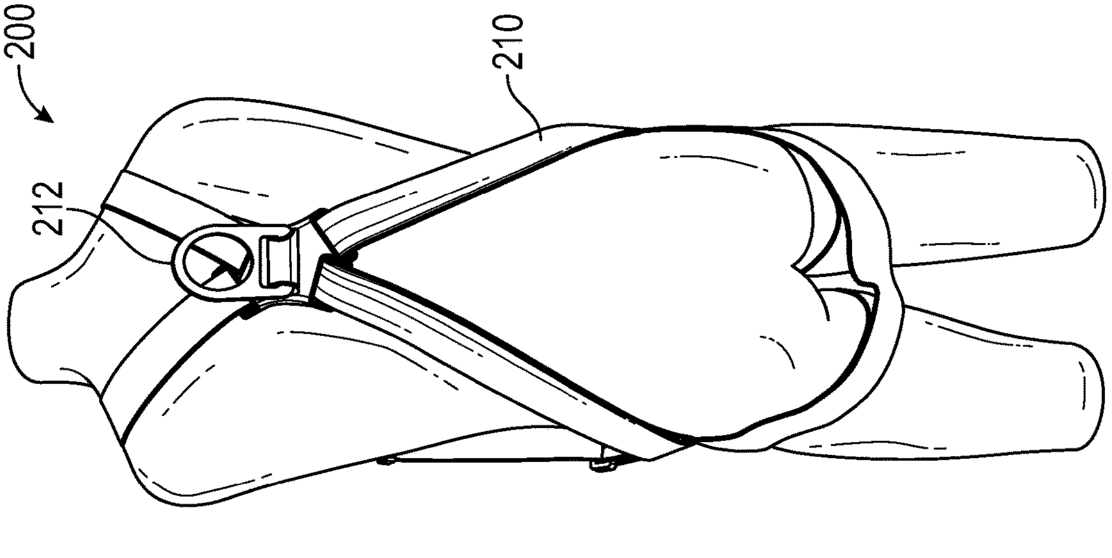
FIG. 3 is a perspective view of a harness of a fall arrest system, according to an exemplary embodiment.
Figure 5:
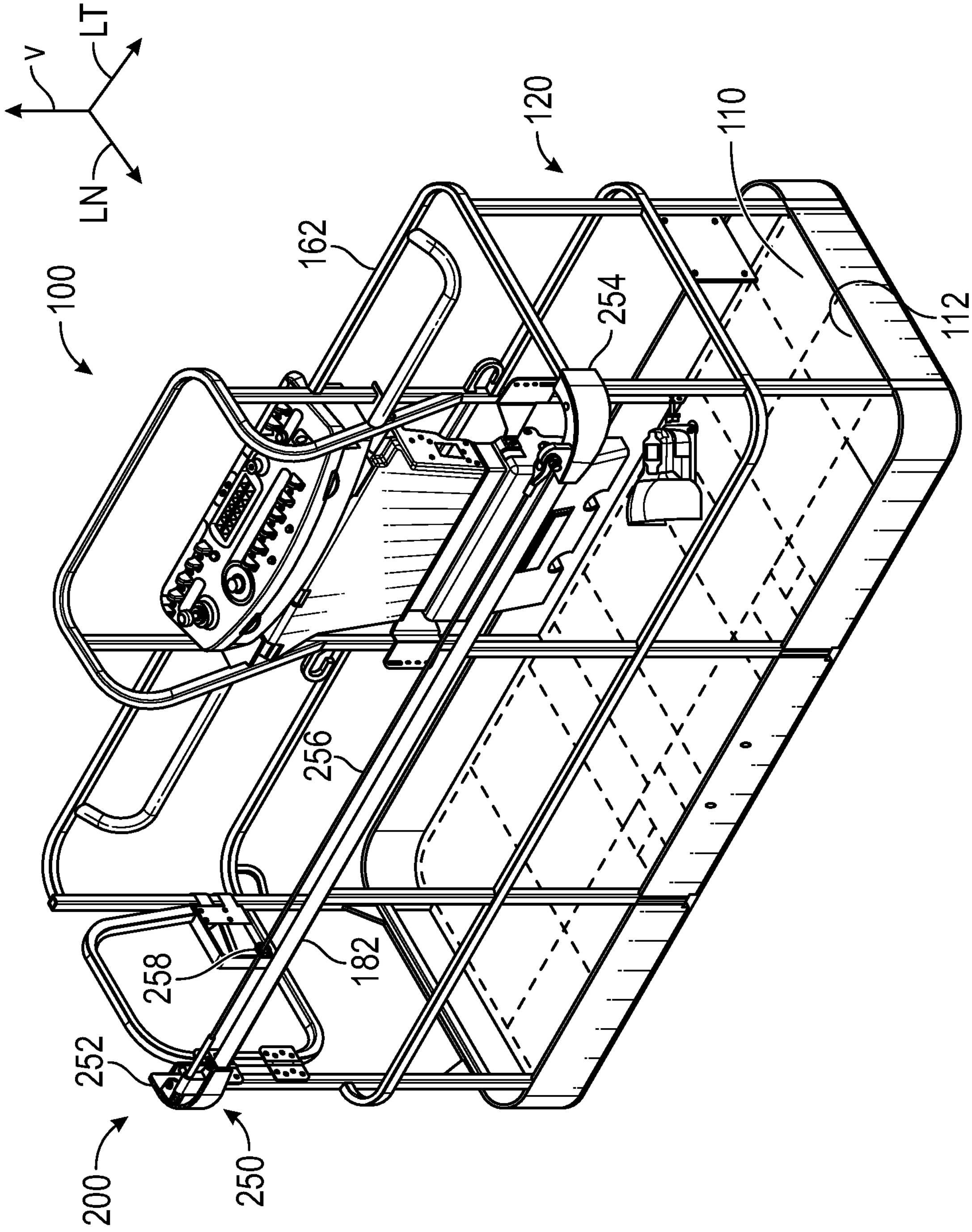
FIGS. 5 and 6 are perspective views of the platform of FIG. 2 outfitted with an anchor assembly of a fall arrest system, according to an exemplary embodiment.
Figure 6:
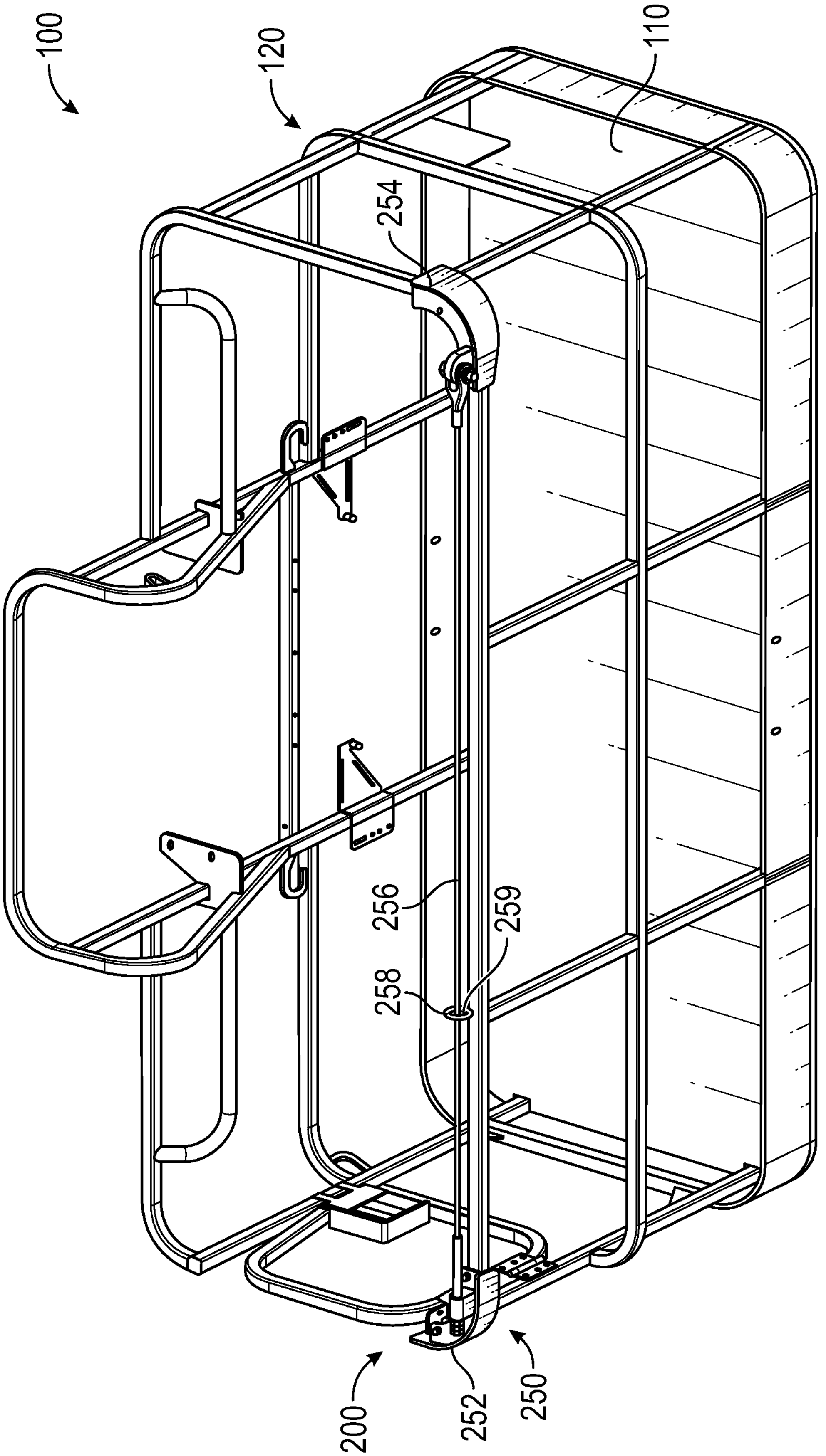

Referring to FIGS. 3 and 4, the platform 100 is configured to work with a fall protection system or fall arrest system 200. Together, the platform 100 and the fall arrest system 200 may be considered a platform assembly. The fall arrest system 200 is configured to protect an operator that falls from the platform 100 or from another object near the platform 100. As shown in FIG. 3, the fall arrest system 200 includes a harness 210. The harness 210 is configured to be connected to (e.g., worn on) the body of an operator such that the operator can be fully supported by the harness 210. The harness includes an attachment point or anchor point, shown as ring 212, through which the harness 210 can be coupled to a support.

As shown in FIG. 4, the fall arrest system 200 further includes a fall limiter 220. The fall limiter 220 may be or include a lanyard, a lifeline, or another type of fall limiter. The fall limiter 220 includes an elongate main body 222 and a pair of connectors 224, one positioned at each end of the main body 222. The connectors 224 (e.g., hooks, clips, etc.) are configured to selectively couple to the ring 212 and to an anchor point, respectively. The main body 222 is configured to elongate (e.g., stretch) in response to an applied tensile force (e.g., an operator falling), while resisting the elongation with a resistive force (e.g., a spring force and/or dampening force). The resistive force is configured to gradually decelerate the operator as the main body 222 extends, absorbing the kinetic energy of the operator and safely arresting their fall. In some embodiments, the main body 222 is an elastic member (e.g., a lanyard). In other embodiments, the main body 222 includes a spool configured to pay out additional length of material (e.g., a self-retracting lifeline).

Referring to FIG. 2, the guardrail 120 defines a series of connectors, shown as fixed anchor points 230. The fixed anchor points 230 are fixedly coupled to the upright members and/or the horizontal members at various locations throughout the platform 100. Each fixed anchor point 230 at least partially defines an aperture configured to receive one of the connectors 224, coupling the fall limiter 220 and the harness 210 to the platform 100. The connector 224 may be moved between different fixed anchor points 230 to facilitate moving to different areas of the platform 100. However, this may require a manual interaction from an operator, which interrupts their workflow. In some situations, an operator may be required to connect to the new fixed anchor point 230 prior to disconnecting from the previous one, requiring additional time and effort. Additionally, the locations of the fixed anchor points 230 may prohibit the operator from exiting the working area 128 without disconnecting from the fixed anchor point 230.

Referring to FIGS. 5-16, the fall arrest system 200 includes a movable anchor point assembly, fall arrest system, fall arrest assembly, or lifeline, shown as anchor assembly 250. The anchor assembly 250 includes (a) a first bracket, fixture, frame, component, or assembly, shown as bracket 252, (b) a second bracket, fixture, frame, component, or assembly, shown as bracket 254, (c) a connecting assembly, support member, elongate assembly, horizontal member, lateral member, or line, shown as cable assembly 256, and (d) an annular member, movable attachment point, harness attachment member, anchor, ring, or harness adapter, shown as anchor 258. The bracket 252 and the bracket 254 are coupled to and extend above the top rail 162 at opposite ends of the first straight section 182. The cable assembly 256 extends between and is coupled to the bracket 252 and the bracket 254 such that the cable assembly 256 is held taut. The anchor 258 defines an aperture 259 that receives the cable assembly 256 therethrough such that the anchor 258 is slidably coupled to the cable assembly 256. The anchor 258 can slide laterally along the length of the cable assembly 256 between the first bracket 252 and the second bracket 254.

In operation, an operator connects one of the connectors 224 of the fall limiter 220 to the anchor 258. Alternatively, the anchor 258 may be omitted, and the connector 224 may be directly coupled to the cable assembly 256. The anchor 258 is captured along the cable assembly 256 and between the first bracket 252 and the second bracket 254 such that the anchor assembly 250 couples the fall limiter 220 to the platform 100. The anchor 258 is free to move along the length of the cable assembly 256 in response to a lateral force being applied to the fall limiter 220 (e.g., when an operator walks along the width of the platform 100). Accordingly, the anchor assembly 250 permits free movement throughout the working area 128 without the operator having to manually disconnect and reconnect the connector 224 (e.g., between the fixed anchor points 230). Further, should an operator choose to move outside of the working area 128 (e.g., through the doorway 130), the fall limiter 220 can stay connected to the anchor assembly 250 throughout this movement. As the operator moves from the working area 128 to the exterior surface, the fall limiter 220 simply moves over the top of the anchor assembly 250. The operator then has unobstructed lateral movement outside of the working area 128. In the event that an operator falls from the platform 100, the cable assembly 256 supports the weight of the operator regardless of the initial lateral position of the anchor 258.

The bracket 252 and the bracket 254 are selectively coupled to the guardrail 120.

Figure 7:
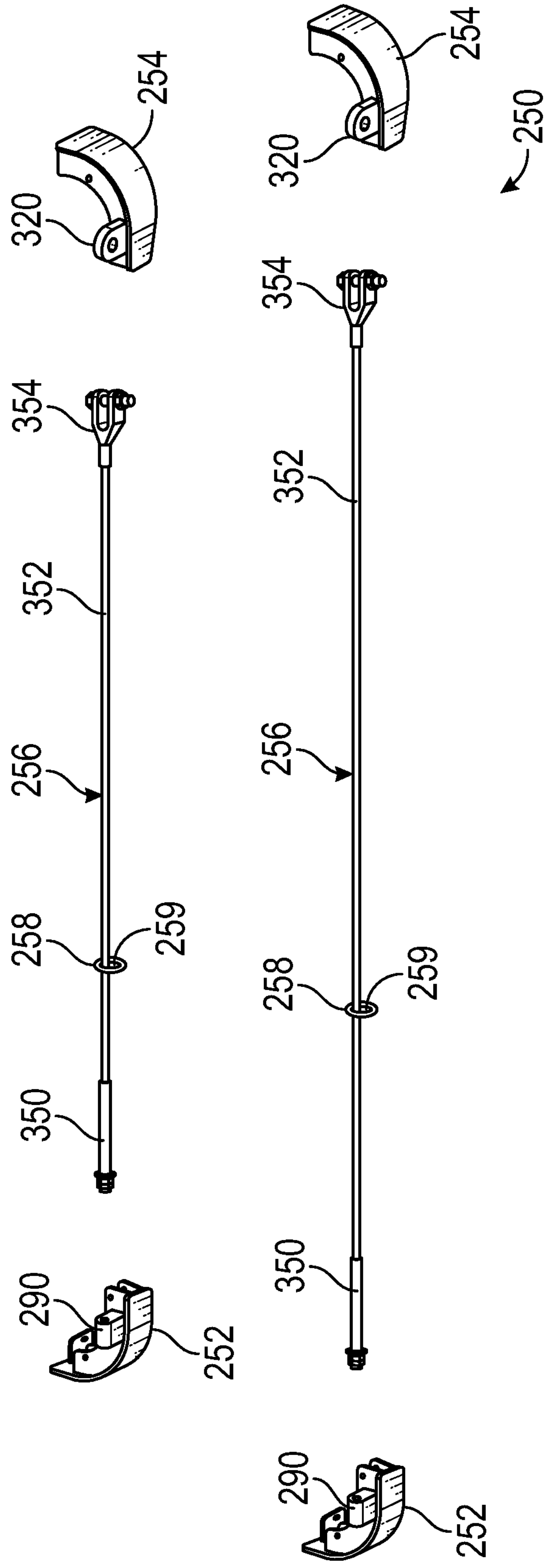
FIG. 7 is a perspective view showing two different configurations of the anchor assembly of FIG. 5.

Accordingly, the anchor assembly 250 can be outfitted onto a variety of different platforms and/or in a variety of different positions. The anchor assembly 250 may be sold as an aftermarket product (e.g., a retrofit kit) and outfitted onto existing platforms 100. Additionally, the anchor assembly 250 can be disassembled and removed from the platform 100. The anchor assembly 250 may then be outfitted onto a different platform 100 or into a different position on the same platform 100. By way of example, in a situation where the benefits of the anchor assembly 250 are only needed occasionally, a small number of anchor assemblies 250 may be able to service a large number of lift devices 10. By way of another example, the anchor assembly 250 may be removed from the front portion 122 of the guardrail 120 and reinstalled on the right portion 124 of the guardrail 120. In situations where the new location of the anchor assembly 250 requires a different spacing between the bracket 252 and the bracket 254 (e.g., the anchor assembly 250 is required to span a larger or shorter length), the cable assembly 256 may be replaced with another cable assembly 256 of a different length. FIG. 7 illustrates two exemplary cable assemblies 256 of different lengths.

Figure 8:
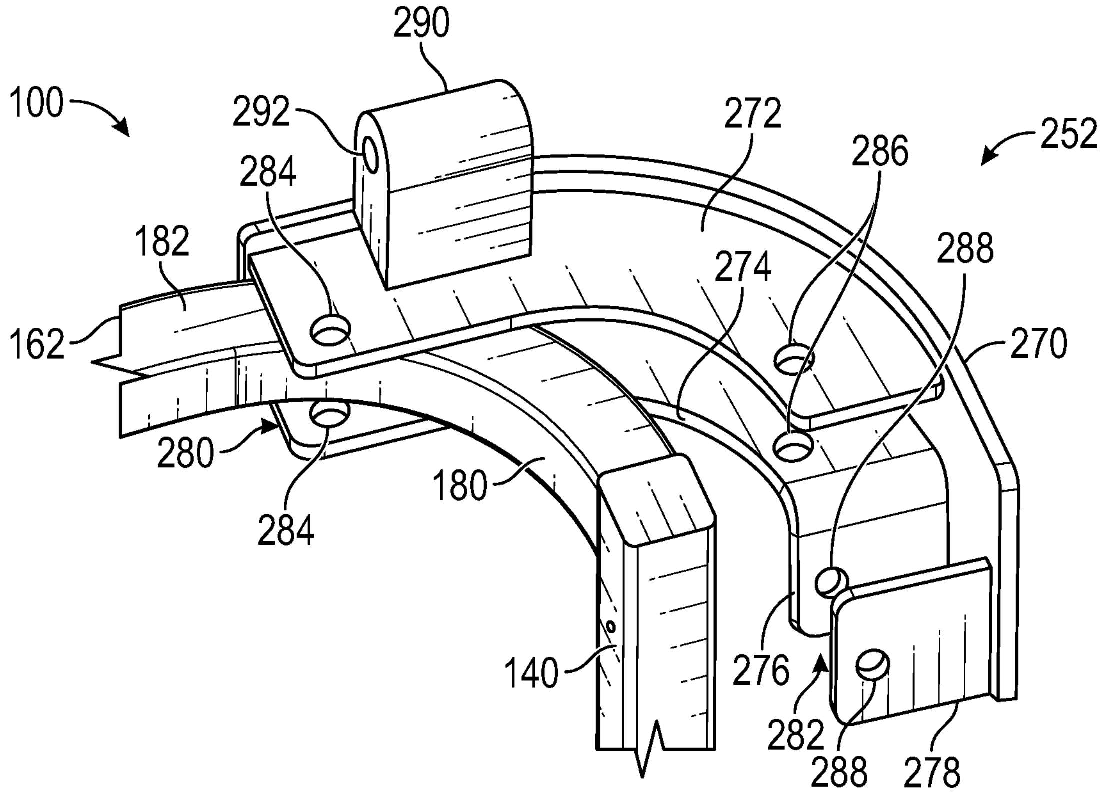
FIGS. 8 and 9 are perspective views of a first bracket of the anchor assembly of FIG. 5.
Figure 9:
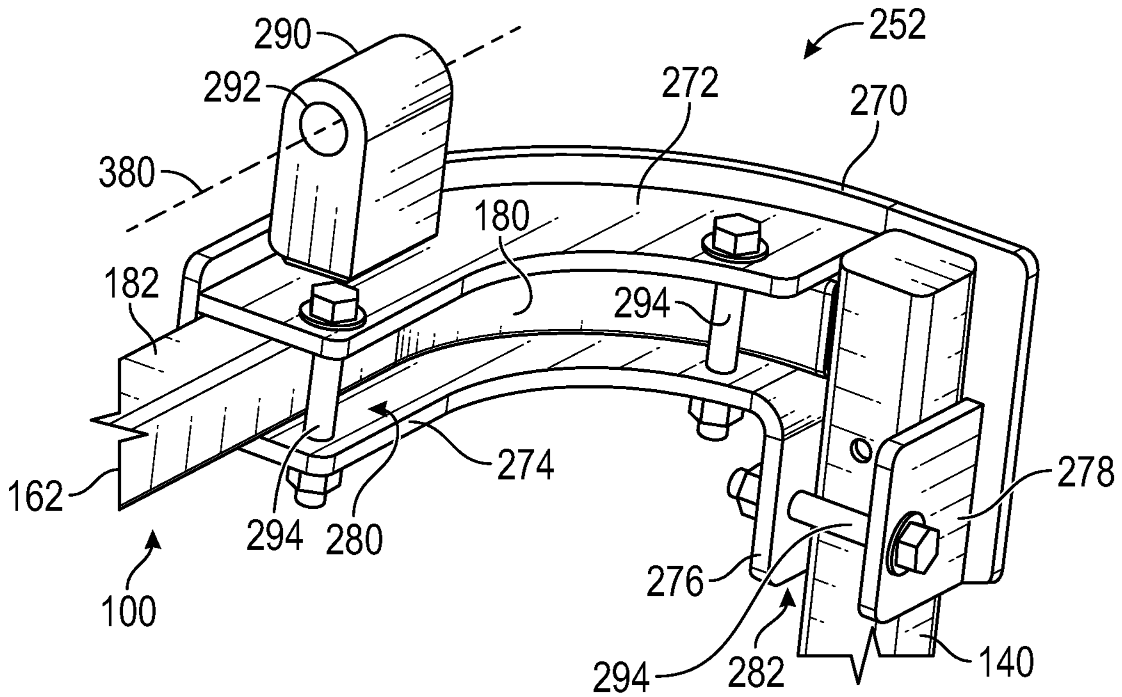

Referring to FIGS. 8 and 9, the bracket 252 is shown. The bracket 252 includes a first portion, section, or component, shown as main plate 270. When installed, the main plate 270 extends along outer surfaces of the top rail 162 and the upright member 140 (i.e., surfaces opposite the working area 128). The main plate 270 is curved and extends substantially vertically. A series of components, sections, or plates are fixedly coupled (e.g., welded) to an inner surface of the main plate 270 and extend inward toward the working area 128 (e.g., radially inward relative to a curvature of the main plate 270). These include a first horizontal plate, shown as top plate 272, a second horizontal plate, shown as bottom plate 274, a first vertical plate, shown as front plate 276, and a second vertical plate, shown as back plate 278. As shown, the bottom plate 274 and the front plate 276 are continuously formed from a single bent sheet of material. In other embodiments, the bottom plate 274 and the front plate 276 are separate pieces.

The top plate 272 and the bottom plate 274 are vertically offset from one another such that a slot, groove, or notch, shown as horizontal slot 280, is defined between the top plate 272, the bottom plate 274, and the main plate 270. Specifically, the top plate 272 and the bottom plate 274 are offset from one another a distance approximately equal to a vertical thickness of the top rail 162 such that the top rail 162 is freely received within the horizontal slot 280. When the top rail 162 is received within the horizontal slot 280, the horizontal slot 280 receives most or all of the first curved section 180 and a portion of the first straight section 182.

The front plate 276 and the back plate 278 are longitudinally offset from one another such that a slot, groove, or notch, shown as vertical slot 282 is defined between the front plate 276, the back plate 278, and the main plate 270. Specifically, the front plate 276 and the back plate 278 are offset from one another a distance approximately equal to a longitudinal thickness of the upright member 140 such that the upright member 140 is freely received within the vertical slot 282. When the upright member 140 is received within the vertical slot 282, the vertical slot 282 receives a top end portion of the upright member 140.

The top plate 272 and the bottom plate 274 each define a first fastener aperture 284 and a second fastener aperture 286. The first fastener apertures 284 are aligned with one another along a first vertical axis, and the second fastener apertures 286 are aligned with one another along a second vertical axis. Similarly, the front plate 276 and the back plate 278 each define a third fastener aperture 288. The third fastener apertures 288 are aligned with one another along a longitudinal axis.

A boss or protrusion, shown as stud receiving boss 290, is fixedly coupled (e.g., welded) to and extends upward from the top plate 272. The stud receiving boss 290 defines a stud aperture or boss aperture, shown as aperture 292, that extends along a lateral axis through the entire width of the stud receiving boss 290. The aperture 292 is positioned above the main plate 270 and the top plate 272.

To couple the bracket 252 to the platform 100, the horizontal slot 280 and the vertical slot 282 are aligned with the top rail 162 and the upright member 140. The bracket 252 is moved laterally toward the platform 100 until the bracket 252 is fully seated. The bracket 252 may be fully seated when the guardrail 120 contacts an inner surface of the main plate 270. When fully seated, the first fastener apertures 284, the second fastener apertures 286, and the third fastener apertures 288 may be positioned inside of the inner surfaces of the first straight section 182, the first curved section 180, and the upright member 140, respectively. A fastener (e.g., a bolt, a pin, etc.), shown as bolt 294, is inserted through each pair of apertures, coupling the bracket 252 to the guardrail 120. The bolts 294 may be tightened to clamp the top plate 272, the bottom plate 274, the front plate 276, and the back plate 278 against the corresponding members of the guardrail 120, further securing the bracket 252. The bracket 252 may subsequently be removed by removing the bolts 294 and moving the bracket 252 laterally outward.

Figure 10:
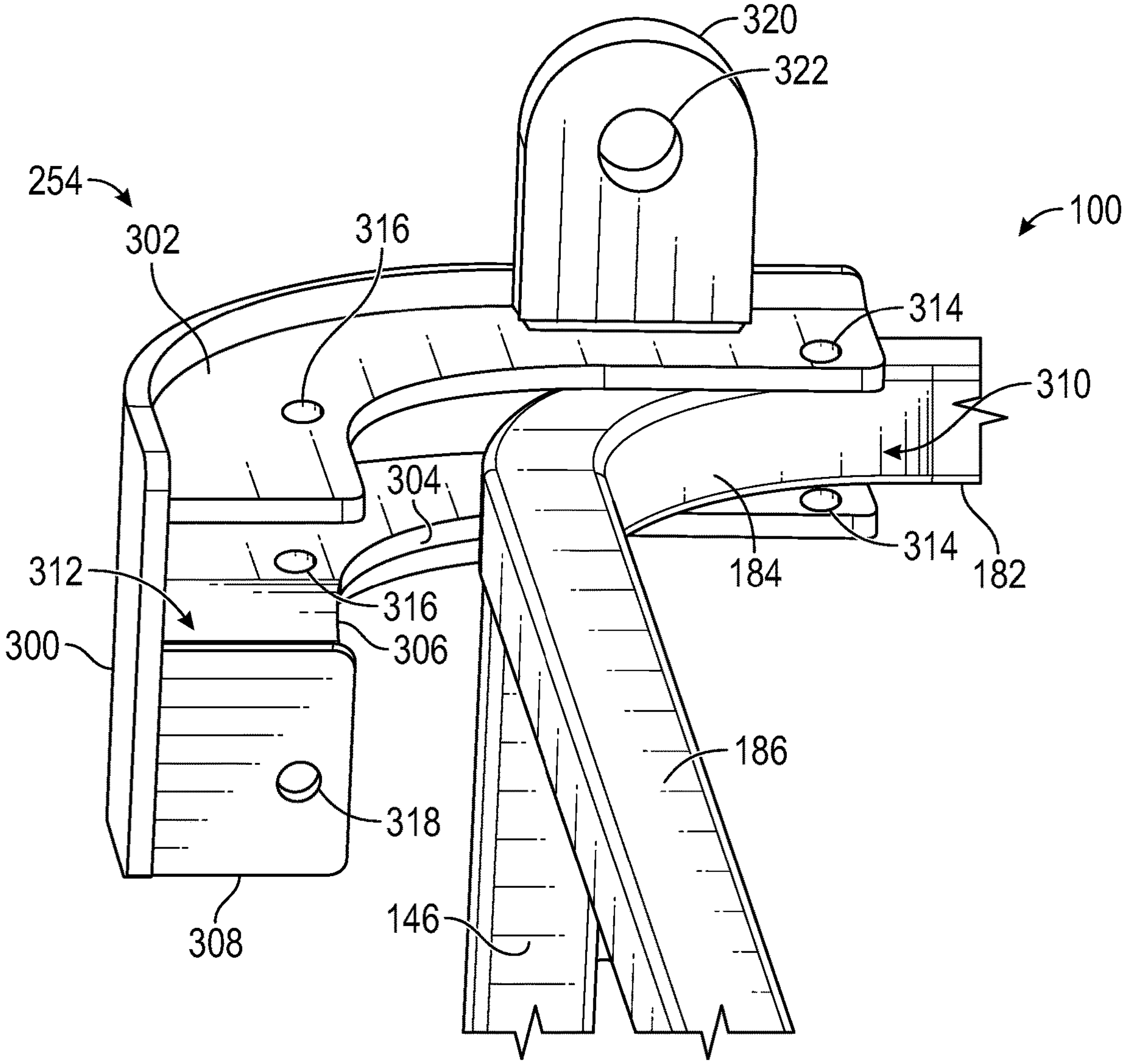
FIGS. 10 and 11 are perspective views of a second bracket of the anchor assembly of FIG. 5.
Figure 11:
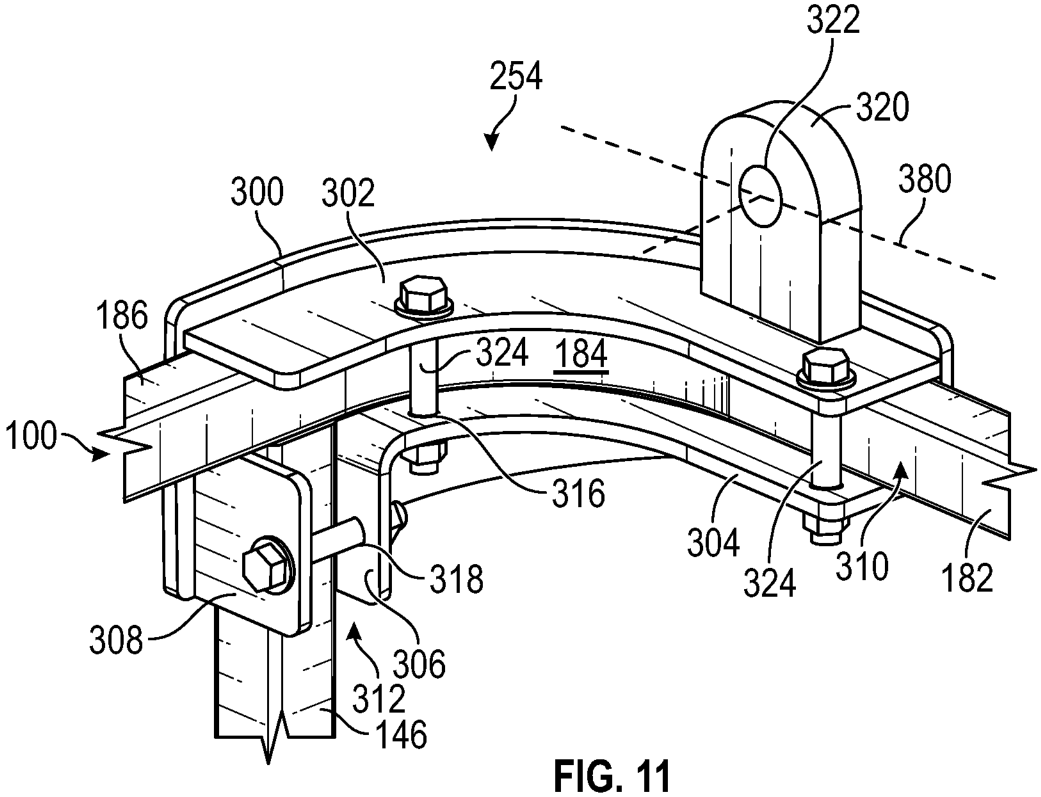
Figure 12:
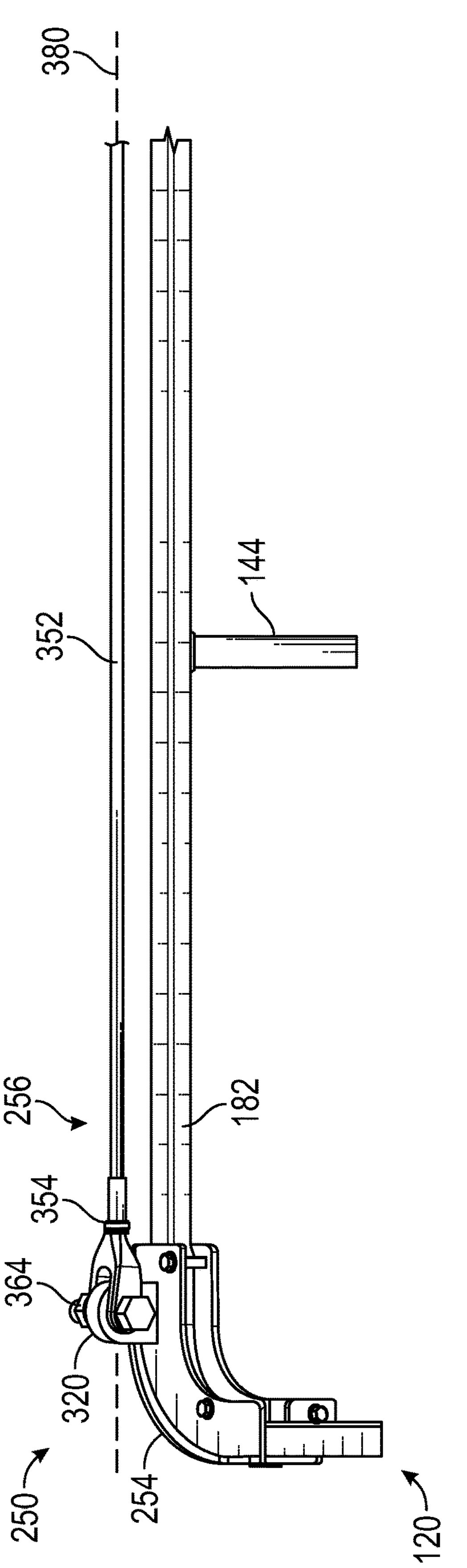
FIGS. 12-16 are perspective views of the anchor assembly of FIG. 5.
Figure 13:
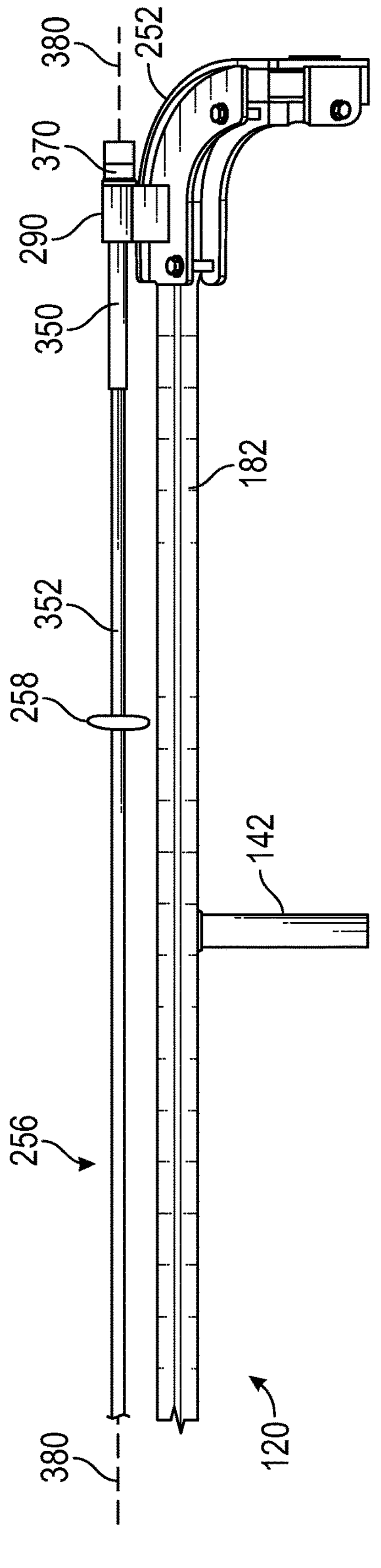

Referring to FIGS. 10 and 11, the bracket 254 is shown. The bracket 254 includes a first portion, section, or component, shown as main plate 300. When installed, the main plate 300 extends along outer surfaces of the top rail 162 and the upright member 146 (i.e., surfaces opposite the working area 128). The main plate 300 is curved and extends substantially vertically. A series of components, sections, or plates are fixedly coupled to an inner surface of the main plate 300 and extend inward toward the working area 128 (e.g., radially inward relative to a curvature of the main plate 300). These include a first horizontal plate, shown as top plate 302, a second horizontal plate, shown as bottom plate 304, a first vertical plate, shown as front plate 306, and a second vertical plate, shown as back plate 308. As shown, the bottom plate 304 and the front plate 306 are continuously formed from a single bent sheet of material. In other embodiments, the bottom plate 304 and the front plate 306 are separate pieces.

The top plate 302 and the bottom plate 304 are vertically offset from one another such that a slot, groove, or notch, shown as horizontal slot 310, is defined between the top plate 302, the bottom plate 304, and the main plate 300. Specifically, the top plate 302 and the bottom plate 304 are offset from one another a distance approximately equal to a vertical thickness of the top rail 162 such that the top rail 162 is freely received within the horizontal slot 310. When the top rail 162 is received within the horizontal slot 310, the horizontal slot 310 receives most or all of the second curved section 184 and a portion of the first straight section 182.

The front plate 306 and the back plate 308 are longitudinally offset from one another such that a slot, groove, or notch, shown as vertical slot 312 is defined between the front plate 306, the back plate 308, and the main plate 300. Specifically, the front plate 306 and the back plate 308 are offset from one another a distance approximately equal to a longitudinal thickness of the upright member 146 such that the upright member 146 is freely received within the vertical slot 312. When the upright member 146 is received within the vertical slot 312, the vertical slot 312 receives a top end portion of the upright member 146.

The top plate 302 and the bottom plate 304 each define a first fastener aperture 314 and a second fastener aperture 316. The first fastener apertures 314 are aligned with one another along a first vertical axis, and the second fastener apertures 316 are aligned with one another along a second vertical axis. Similarly, the front plate 306 and the back plate 308 each define a third fastener aperture 318. The third fastener apertures 318 are aligned with one another along a longitudinal axis.

A boss or protrusion (e.g., a clevis coupling boss), shown as clevis receiving boss 320, is fixedly coupled to and extends upward from the top plate 302. The clevis receiving boss 320 defines a boss aperture, shown as aperture 322, that extends along a longitudinal axis, substantially perpendicular to the lateral axis of the aperture 292 of the stud receiving boss 290. The aperture 322 is positioned above the main plate 300 and the top plate 302. In some embodiments the bracket 252 and the bracket 254 have a mirrored symmetry with one another (e.g., the features of the bracket 252 and the bracket 254 are symmetrical about a plane extending perpendicular to a lateral axis), except for the clevis receiving boss 320 and the stud receiving boss 290.

To couple the bracket 254 to the platform 100, the horizontal slot 310 and the vertical slot 312 are aligned with the top rail 162 and the upright member 146. The bracket 254 is moved laterally toward the platform 100 until the bracket 254 is fully seated. The bracket 254 may be fully seated when the guardrail 120 contacts an inner surface of the main plate 300. When fully seated, the first fastener apertures 314, the second fastener apertures 316, and the third fastener apertures 318 may be positioned inside of the inner surfaces of the first straight section 182, the second curved section 184, and the upright member 146, respectively. A fastener (e.g., a bolt, a pin, etc.), shown as bolt 324, is inserted through each pair of apertures, coupling the bracket 254 to the guardrail 120. The bolts 324 may be tightened to clamp the top plate 302, the bottom plate 304, the front plate 306, and the back plate 308 against the corresponding members of the guardrail 120, further securing the bracket 254. The bracket 254 may subsequently be removed by removing the bolts 324 and moving the bracket 254 laterally outward.

Referring to FIGS. 12-16, the cable assembly 256 is shown according to an exemplary embodiment. The cable assembly 256 extends laterally from the stud receiving boss 290 to the clevis receiving boss 320. The cable assembly 256 includes a first connector, shown as stud 350, an elongated member or cable (e.g., a rope, a string, a cord, a wire, etc.), shown as cable 352, and a second connector or yoke, shown as clevis 354. The stud 350 is coupled to a first end of the cable 352, and the clevis 354 is coupled to an opposing end of the cable 352. The cable 352 may have one or more strands (e.g., one. The stud 350 and the clevis 354 may be fixedly or removably coupled to the cable 352 (e.g., through swaging, crimping, brazing, welding, fastening, or another type of connection).

Figure 14:
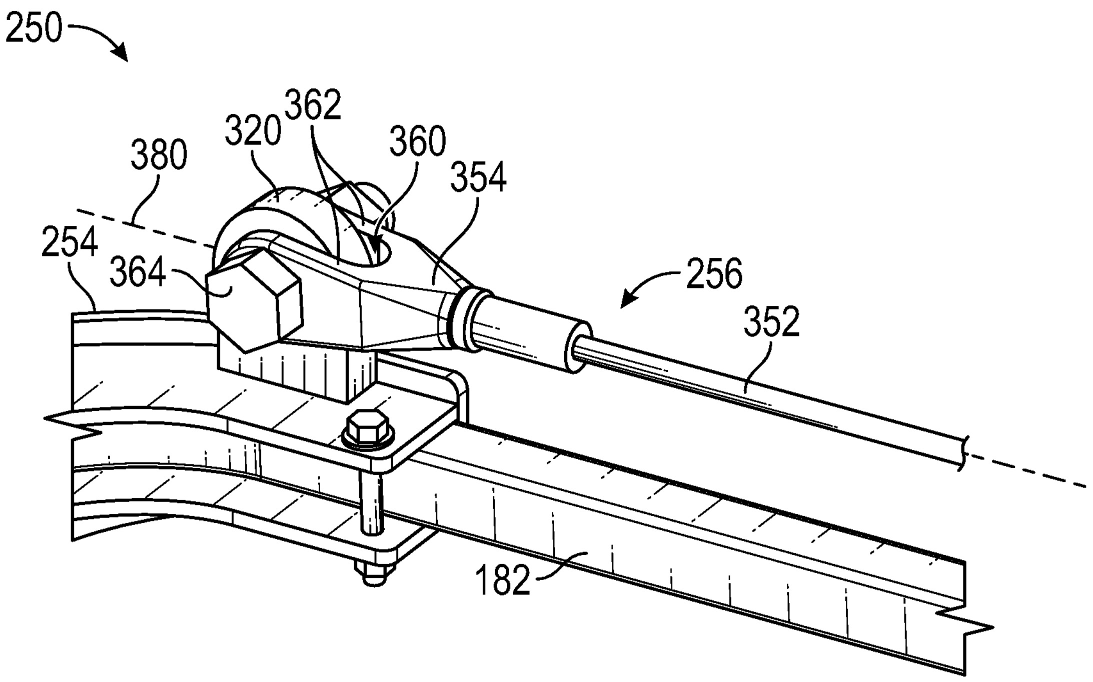

Referring to FIG. 14, the clevis 354 is coupled to the bracket 254. Specifically, the clevis 354 defines a slot or groove, shown as slot 360, that receives the clevis receiving boss 320. The slot 360 divides the clevis 354 to define a pair of jaws 362. Each jaw 362 defines an aperture, and both apertures are aligned along a longitudinal axis. A shear member (e.g., a fastener or pin), shown as bolt 364, extends through the aperture of one jaw 362, the aperture 322 of the clevis receiving boss 320, and the aperture of the other jaw 362, coupling the clevis 354 to the clevis receiving boss 320. Specifically, engagement between the jaws 362 and the clevis receiving boss 320 limits (e.g., prevents) longitudinal movement of the clevis 354, and the bolt 364 limits vertical and lateral movement of the clevis 354.

Figure 15:
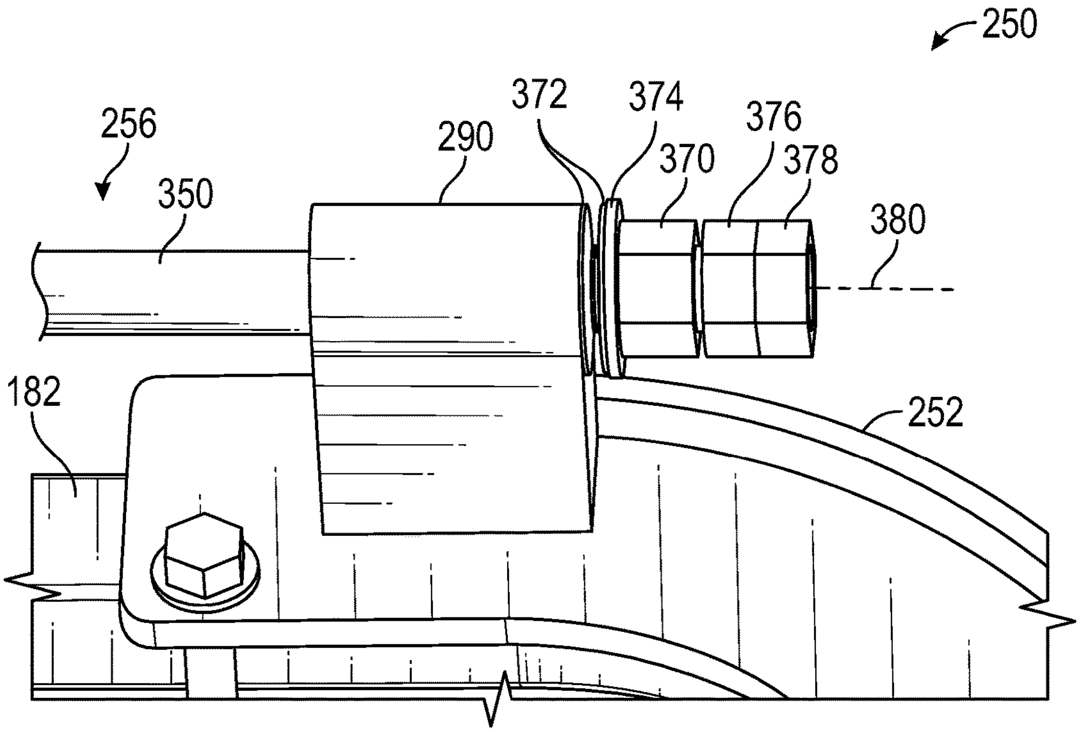
Figure 16:
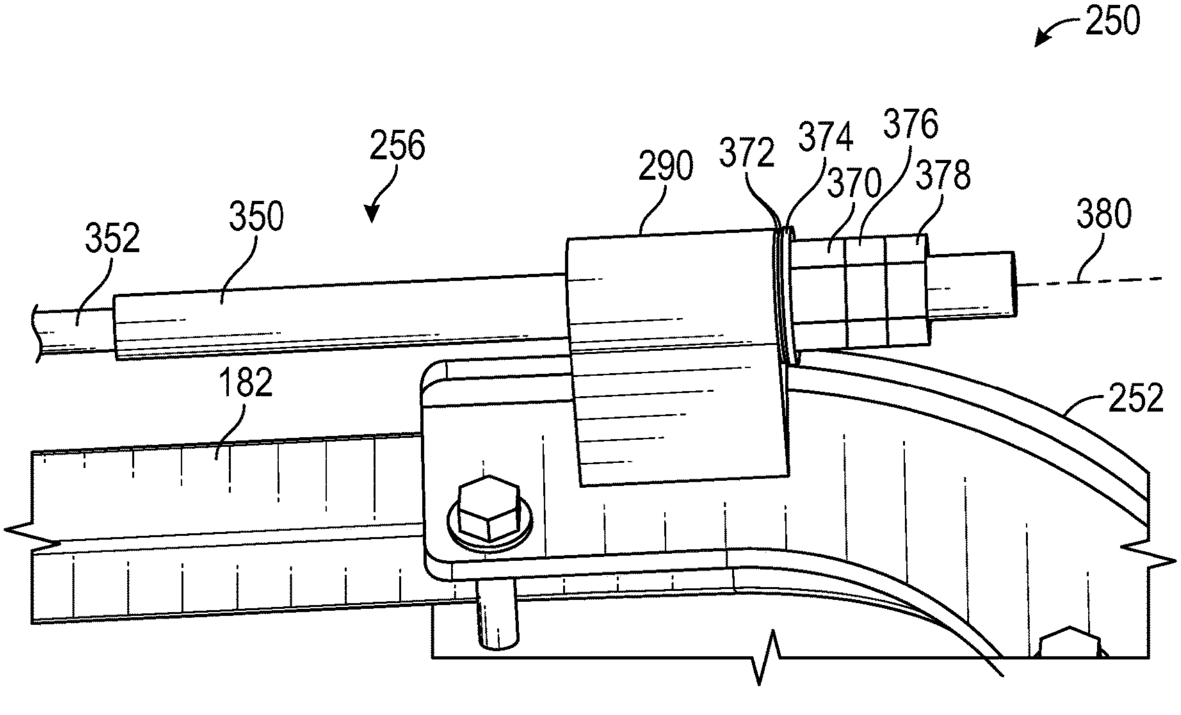

Referring to FIGS. 15 and 16, the stud 350 is coupled to the bracket 252. Specifically, the stud 350 is received within the aperture 292 of the stud receiving boss 390. At least a portion of the stud 350 is threaded (e.g., a portion of the stud 350 distal to the cable 352). A fastener, shown as nut 370, is threaded onto the stud 350 on a side of the stud receiving boss 290 opposite the bracket 254. One or more biasing members 372 are positioned between the nut 370 and the stud receiving boss 290. As shown, the anchor assembly 250 includes two biasing members 372, and the biasing members 372 are spring washers (e.g., Belleville washers). In other embodiments, the anchor assembly 250 may include more or fewer biasing members 372, and the biasing members 372 may be any type of biasing member (e.g., compression springs, wave springs, etc.). A washer 374 is positioned between the nut 370 and the biasing members 372. A pair of fasteners, shown as jam nuts 376 and 378, are threaded onto the stud 350 such that the nut 370 is positioned between the washer 374 and the jam nut 368.

When the nut 370 is tightened, the washer 374 presses against the biasing members 372. The biasing members 372 press against the stud receiving boss 290, compressing the biasing members 372. The biasing members 372 accordingly apply a lateral biasing force on the washer 374 and the nut 370, forcing the nut 370 laterally outward and tensioning the cable 352. The tension on the cable 352 may be adjusted by tightening or loosening the nut 370. Once a desired tension is achieved, the jam nut 376 may be tightened against the nut 370, frictionally locking the nut 370 in place and preventing the nut 370 from loosening over time (e.g., due to vibration). The jam nut 378 may be tightened against the jam nut 376 to further lock the nut 370 in place.

Referring to FIGS. 9, 11, 14 and 16, with the nut 370 tightened, the components of the cable assembly 256 may be substantially aligned along a lateral axis 380. Specifically, the stud 350, the cable 352, the clevis 354, the nut 370, the biasing members 372, the washer 374, the jam nut 376, and the jam nut 378 are all aligned along the lateral axis 380. The lateral axis 380 extends through the center of the aperture 292 of the stud receiving boss 290. The lateral axis 380 extends through the center of the clevis receiving boss 320 and substantially perpendicular to the aperture 322. The lateral axis 380 and the cable assembly 256 are positioned a distance above the top rail 162. The lateral axis 380 is approximately longitudinally centered with the first straight section 182 of the top rail 162.

Referring to FIGS. 9-16, according to an exemplary embodiment, to assemble the anchor assembly 250 with the platform 100, the bracket 252 and the bracket 254 are placed onto the guardrail 120 with the bolts 294 and the bolts 324 inserted but partially loosened, permitting small amounts of relative moment between the brackets 252 and 254 and the guardrail 120. The cable 352 is cut to an appropriate length (e.g., based on the length of the first straight section 182), and the stud 350 and the clevis 354 are coupled to the cable 352. The clevis receiving boss 320 is inserted into the slot 360, and the bolt 364 is inserted through the jaws 362 and the aperture 322 and tightened. The anchor 258 is slid onto the cable assembly 256. The stud 350 is inserted through the aperture 292 of the stud receiving boss 290. The biasing members 372, the washer 374, the nut 370, and the jam nuts 376 and 378 are slid or threaded onto the stud 350. The nut 370 is tightened until the cable 352 achieves a desired tension (e.g., as determined using a torque applied to the nut 370). The jam nut 376 is tightened against the nut 370. The jam nut 378 is tightened against the jam nut 376. The bolts 294 and the bolts 324 are tightened to secure the bracket 252 and the bracket 254.

In use, an operator dons the harness 210 and attaches one connector 224 of the fall limiter 220 to the ring 212. The operator attaches the other connector 224 to the anchor 258 of the anchor assembly 250. In an alternative embodiment, the operator attaches this connector 224 directly to the cable 352, and the connector 224 is configured to slide along the cable 352. At this point, the operator is secured.

To remove the anchor assembly 250 (e.g., for installation onto a different lift device 10), the anchor assembly 250 is disassembled. Specifically, the nut 370, the jam nut 376, and the jam nut 378 may be loosened to decouple (e.g., remove) the stud 350 from the bracket 252. The bolt 364 may be loosened and removed to decouple the clevis 354 from the bracket 254. The bolts 294 and the bolts 324 may be loosened and removed to decouple the bracket 252 and the bracket 254 from the guardrail 120.

The width (e.g., the lateral dimension) of the platform 100 may vary between different lift devices 10. To accommodate platforms 100 having various widths, the length of the cable 352 may be customized (e.g., cut to a specific length) based on the dimensions of the platform 100. Accordingly, the anchor assembly 250 may be used with a variety of different platforms 100 without having to produce a variety of different components (e.g., the bracket 252 and the bracket 254) custom fitted to each platform 100.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fall arrest system as shown in the various exemplary embodiments is illustrative only. Additionally, any element disclosed in one embodiment may be incorporated or utilized with any other embodiment disclosed herein. For example, either of the cable assemblies 256 shown in FIG. 7 may be incorporated in the fall arrest system 200 of the exemplary embodiment shown in at least FIG. 5. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A fall arrest system for use with a platform, comprising:
a harness configured to be worn by an operator;
a first bracket and a second bracket configured to be coupled to the platform, wherein the first bracket defines a recess configured to receive a guardrail of the platform when the first bracket is coupled to the platform, and wherein the second bracket includes a boss;
a horizontal support including a first end portion coupled to the first bracket and a second end portion coupled to the second bracket, wherein the second end portion forms a slot configured to receive the boss; and
a harness adapter coupled to the harness, the harness adapter defining an aperture that receives the horizontal support,
wherein the harness adapter is repositionable along a length of the horizontal support.

2. The fall arrest system of claim 1, wherein the first bracket and the second bracket are removably coupled to the platform.

3. The fall arrest system of claim 2, wherein the horizontal support is removably coupled to the first bracket and the second bracket.

4. The fall arrest system of claim 1, wherein the boss is a first boss, wherein the first bracket includes a second boss defining a boss aperture, and wherein the first end portion of the horizontal support extends through the boss aperture.

5. The fall arrest system of claim 4, wherein the first end portion of the horizontal support includes a threaded stud, further comprising a fastener in threaded engagement with the threaded stud, and wherein the fastener engages the second boss to apply tension to the horizontal support.

6. The fall arrest system of claim 1, wherein the boss defines a boss aperture and the second end portion of the horizontal support defines a first support aperture and a second support aperture, wherein the first support aperture and the second support aperture are configured to align with the boss aperture when the slot receives the boss.

7. The fall arrest system of claim 6, wherein the horizontal support includes a cable extending between the first end portion and the second end portion.

8. The fall arrest system of claim 4, wherein the second boss extends above the recess such that the horizontal support is positioned above the guardrail when the first bracket is coupled to the platform.

9. The fall arrest system of claim 1, wherein the recess is configured to receive a first member of the guardrail of the platform when the first bracket is coupled to the platform.

10. The fall arrest system of claim 9, wherein the recess is a first recess, wherein the first bracket further defines a second recess configured to receive a second member of the guardrail when the first bracket is coupled to the platform, and wherein the first recess is angularly offset from the second recess.

11. The fall arrest system of claim 10, wherein the first recess and the second recess are substantially perpendicular to one another.

12. The fall arrest system of claim 10, wherein the second bracket further defines a third recess configured to receive the guardrail when the second bracket is coupled to the platform.

13. A platform assembly, comprising:
a platform defining a support surface for an operator, the platform including a guardrail fixedly coupled to the support surface;
a first bracket removably coupled to the guardrail and defining a lateral aperture;
a second bracket removably coupled to the guardrail and laterally offset from the first bracket;
a support member coupled to the first bracket and the second bracket and extending laterally between the first bracket and the second bracket;
an anchor slidably coupled to the support member such that the anchor is repositionable laterally along the support member; and
a fall limiter coupling the anchor to a harness,
wherein the support member is positioned above the guardrail and received by the lateral aperture of the first bracket, and wherein the support member is substantially centered about a lateral axis that extends through the lateral aperture.

14. A platform assembly, comprising:
a platform defining a support surface for an operator, the platform including a guardrail fixedly coupled to the support surface;
a first bracket removably coupled to the guardrail, the first bracket defining (a) a first recess that receives a vertical member of the guardrail and (b) a second recess that receives a horizontal member of the guardrail, wherein the first recess and the second recess extend substantially perpendicular to one another;
a second bracket removably coupled to the guardrail and laterally offset from the first bracket;
a support member coupled to the first bracket and the second bracket and extending laterally between the first bracket and the second bracket;
an anchor slidably coupled to the support member such that the anchor is repositionable laterally along the support member; and
a fall limiter coupling the anchor to a harness,
wherein the support member is positioned above the guardrail.

15. A method of providing a fall arrest system, comprising:
providing a harness adapter configured to be coupled to a harness worn by an operator;
coupling a first bracket to a first guardrail of a first platform such that the first bracket engages a front surface and a first side surface of the first guardrail;
coupling a second bracket to the first guardrail such that the second bracket engages the front surface and a second side surface of the first guardrail opposite the first side surface;
coupling a first end portion of a tensile member to the first bracket;
inserting the tensile member through an aperture defined by the harness adapter such that the harness adapter is repositionable along a length of the tensile member;
coupling a second end portion of the tensile member to the second bracket;
decoupling the first bracket and the second bracket from the first guardrail; and
coupling the first bracket and the second bracket to a second guardrail of a second platform.

16. The method of claim 15, wherein the second end portion of the tensile member includes a threaded stud, and wherein coupling the second end portion of the tensile member to the second bracket includes:
inserting the threaded stud through a stud aperture defined by the second bracket; and
engaging a fastener with the threaded stud such that the fastener applies a force against the second bracket to tension the tensile member.

17. The method of claim 15, wherein the tensile member is a first tensile member, further comprising:
decoupling the first bracket and the second bracket from the first tensile member;
coupling a first end portion of a second tensile member to the first bracket;
inserting the second tensile member through the aperture defined by the harness adapter such that the harness adapter is repositionable along a length of the second tensile member; and
coupling a second end portion of the second tensile member to the second bracket,
wherein the length of the first tensile member is different than the length of the second tensile member.

18. The fall arrest system of claim 6, wherein a pin runs through the boss aperture, the first support aperture, and the second support aperture, coupling the slot to the boss.

* * * * *